(12) United States Patent
Fang et al.

(10) Patent No.: US 12,135,160 B2
(45) Date of Patent: Nov. 5, 2024

(54) REFRIGERATOR AND CONTROL METHOD, DEVICE AND SYSTEM THEREOF

(71) Applicants: HEFEI MIDEA REFRIGERATOR CO., LTD., Anhui (CN); HEFEI HUALING CO., LTD., Anhui (CN); MIDEA GROUP CO., LTD., Guangdong (CN)

(72) Inventors: Ruiming Fang, Anhui (CN); Yu Li, Anhui (CN)

(73) Assignees: HEFEI MIDEA REFRIGERATOR CO., LTD., Anhui (CN); HEFEI HUALING CO., LTD., Anhui (CN); MIDEA GROUP CO., LTD., Guangdong (CN)

( * ) Notice: Subject to any disclaimer, the term of this patent is extended or adjusted under 35 U.S.C. 154(b) by 595 days.

(21) Appl. No.: 17/420,292

(22) PCT Filed: Jan. 9, 2019

(86) PCT No.: PCT/CN2019/070940
§ 371 (c)(1),
(2) Date: Jul. 1, 2021

(87) PCT Pub. No.: WO2020/142915
PCT Pub. Date: Jul. 16, 2020

(65) Prior Publication Data
US 2022/0090841 A1 Mar. 24, 2022

(51) Int. Cl.
*F25D 21/00* (2006.01)
*G05B 19/042* (2006.01)

(52) U.S. Cl.
CPC ........ *F25D 21/006* (2013.01); *F25D 21/008* (2013.01); *G05B 19/042* (2013.01); *F25B 2600/01* (2013.01); *F25C 2600/02* (2013.01); *F25D 2600/02* (2013.01); *G05B 2219/2654* (2013.01)

(58) Field of Classification Search
CPC .. F25C 2600/02; F25D 21/006; F25D 21/008; F25D 2600/02
See application file for complete search history.

(56) References Cited

U.S. PATENT DOCUMENTS

| 4,646,536 A | 3/1987 | Yamada et al. |
| 7,681,406 B2 | 3/2010 | Cushman et al. |

(Continued)

FOREIGN PATENT DOCUMENTS

| CN | 1175677 A | 3/1998 |
| CN | 2557894 Y | 6/2003 |

(Continued)

*Primary Examiner* — Jonathan Bradford
(74) *Attorney, Agent, or Firm* — Seed IP Law Group LLP

(57) ABSTRACT

A refrigerator and a control method, device and system thereof are included. The method includes detecting and confirming that the cumulative running time of a compressor is no less than a running time threshold, and an ice maker is currently in a working state, and controlling the ice maker to perform a defrosting operation after a current ice making period is ended, the running time threshold being a time difference between the defrosting period of the refrigerator and the ice making period of the ice maker.

10 Claims, 4 Drawing Sheets

(56) References Cited

U.S. PATENT DOCUMENTS

| | | | |
|---|---|---|---|
| 2005/0076654 A1* | 4/2005 | Chung | F25D 17/065 62/190 |
| 2008/0190125 A1 | 8/2008 | Yoshioka et al. | |
| 2013/0025303 A1 | 1/2013 | Yoon et al. | |
| 2016/0370083 A1 | 12/2016 | Koo | |
| 2018/0283758 A1 | 10/2018 | Ding et al. | |
| 2018/0328642 A1 | 11/2018 | McCollough et al. | |

FOREIGN PATENT DOCUMENTS

| | | |
|---|---|---|
| CN | 1607368 A | 4/2005 |
| CN | 100374799 C | 3/2008 |
| CN | 101793454 A | 8/2010 |
| CN | 103411380 A | 11/2013 |
| CN | 104813119 A | 7/2015 |
| CN | 105758107 A | 7/2016 |
| CN | 106440609 A | 2/2017 |
| JP | 6-34249 A | 2/1994 |
| JP | 2002022336 A | 1/2002 |
| JP | 3545617 B2 | 7/2004 |
| JP | 2006-226615 A | 8/2006 |
| WO | 2010/099439 A2 | 9/2010 |

* cited by examiner

S1 — detecting and confirming that a cumulative running time of a compressor is at least a running time threshold and an ice maker is in a working state at the moment, and controlling the ice maker to perform a defrosting operation after a current ice making cycle is ended, wherein the running time threshold is a time difference between a defrosting cycle of the refrigerator and the ice making cycle of the ice maker

Figure 1

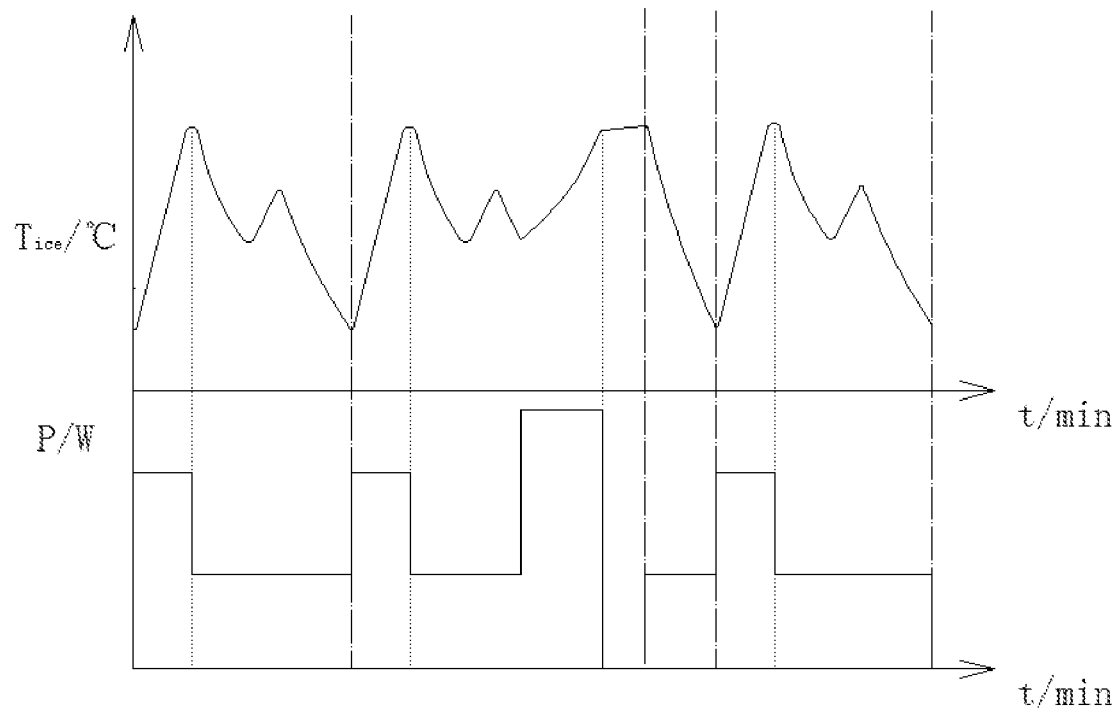

Figure 2

REFRIGERATOR AND CONTROL METHOD, DEVICE AND SYSTEM THEREOF

BACKGROUND

Technical Field

The present disclosure relates to the field of household appliances technique, and particularly relates to a method for controlling a refrigerator, a control apparatus of the refrigerator, a control system of the refrigerator and the refrigerator.

Description of the Related Art

At present, determination of defrosting for a refrigerator with an ice making function can be divided into the following two circumstances. One circumstance is that, performing defrosting when a compressor meets a specific running time or other conditions without distinguishing the current working state of an ice maker. However, if the refrigerator starts the defrosting operation during an ice making cycle, it will cause the temperature of an ice making chamber to rise sharply. The ice maker is not able to continue making the ice normally in this cycle, thereby extending the ice making cycle, decreasing an ice making capacity and increasing energy consumption. The other circumstance is that, when meeting a defrosting condition, the system will perform a judgement that whether the ice maker is in the working state at the moment, and performs defrosting normally if the ice maker is not in the working state at the moment; while if the ice maker is in the working state at the moment, the defrosting operation will be delayed and the compressor downtime will be delayed, and the ice maker continues to make ice. However, a delayed defrosting operation will increase a risk of a frost jam caused by the extended defrosting cycle. After the frost jam occurs, the system will not be able to form a closed loop or consume more energy, thereby reducing the reliability of the refrigerator.

BRIEF SUMMARY

The present disclosure aims to solve at least one of the technical problems in the related art to a certain degree.

Accordingly, a first object of the present disclosure is to provide a method for controlling a refrigerator. The method allows the refrigerator to avoid performing defrosting within an ice making cycle, thereby reducing the adverse influence of defrosting on the ice maker, effectively increasing ice making efficiency and ice making capacity of the ice maker, shortening the ice making cycle, reducing energy consumption and improving the reliability of the refrigerator A second object of the present disclosure is to provide a control apparatus of a refrigerator.

A third object of the present disclosure is to provide a control system of a refrigerator.

A fourth object of the present disclosure is to provide a refrigerator.

A fifth object of the present disclosure is to provide an electronic device.

A sixth object of the present disclosure is to provide a non-temporary computer-readable storage medium.

For the above objects, in a first aspect, the present disclosure provides in embodiments a method for controlling a refrigerator. The method includes detecting and confirming that a cumulative running time of a compressor is no less than a running time threshold and an ice maker is in a working state at the moment, and controlling the ice maker to perform a defrosting operation after the current ice making cycle is ended. The running time threshold is the time difference between a defrosting cycle of the refrigerator and the ice making cycle of the ice maker.

According to some embodiments in the present disclosure, the method for controlling a refrigerator detects and confirms that the cumulative running time of the compressor is no less than the time difference between the defrosting cycle of the refrigerator and the ice making cycle of the ice maker and the ice maker is in the working state at the moment, and controls the ice maker to perform the defrosting operation after the current ice making cycle is completed. The method can avoid performing defrosting during the ice making cycle, thereby reducing the adverse influence of defrosting on the ice maker, effectively increasing the ice making efficiency and ice making capacity of the ice maker, shortening the ice making cycle, reducing energy consumption and improving the reliability of the refrigerator.

In addition, the method for controlling a refrigerator provided according to the above embodiments of the present disclosure may further include the following additional technical features.

According to an embodiment of the present disclosure, the method for controlling a refrigerator as described above further includes detecting and confirming that the cumulative running time is no less than the running time threshold and the ice maker is currently in a non-working state, and controlling the ice maker to not issue an ice making request; and detecting and confirming that the cumulative running time reaches the defrosting cycle, and controlling the refrigerator to perform the defrosting operation.

According to an embodiment of the present disclosure, controlling the ice maker to perform the defrosting operation after a current ice making cycle is ended includes detecting and confirming that the current ice making cycle is ended, and controlling the ice maker to perform the defrosting operation.

For the above objects, in a second aspect, the present disclosure provides in embodiments a control apparatus of a refrigerator. The control apparatus includes a controlling module, configured to detect and confirm that a cumulative running time of a compressor is no less than a running time threshold and an ice maker is in a working state at the moment, and control the ice maker to perform a defrosting operation after the current ice making cycle is ended. The running time threshold is the time difference between a defrosting cycle of the refrigerator and the ice making cycle of the ice maker.

According to the control apparatus of the refrigerator in embodiments of the present disclosure, the controlling module detects and confirms that the cumulative running time of the compressor is no less than the time difference between the defrosting cycle of the refrigerator and the ice making cycle of the ice maker and the ice maker is in the working state at the moment, and controls the ice maker to perform the defrosting operation after the current ice making cycle completed. The apparatus can avoid performing defrosting during the ice making cycle, thereby reducing the adverse influence of defrosting on the ice maker, effectively increasing the ice making efficiency and ice making capacity of the ice maker, shortening the ice making cycle, reducing energy consumption and improving the reliability of the refrigerator.

In addition, the control apparatus of a refrigerator provided according to the above embodiments of the present disclosure may further include the following additional technical features.

According to an embodiment of the present disclosure, the controlling module is further configured to detect and confirm that the cumulative running time is no less than the running time threshold and the ice maker is currently in a non-working state, and control the ice maker to not issue an ice making request; and detect and confirm that the cumulative running time reaches the defrosting cycle, and control the refrigerator to perform the defrosting operation.

According to an embodiment of the present disclosure, the controlling module is further configured to detect and confirm that the cumulative running time is no less than the running time threshold and the ice maker is in the working state at the moment; and detect and confirm the current ice making cycle is ended, and control the ice maker to perform the defrosting operation.

For the above objects, in a third aspect, the present disclosure provides in embodiments a control system of a refrigerator, which includes a compressor, an ice maker and the control apparatus as described above.

According to embodiments of the present disclosure, using the above described control apparatus, the control system of the refrigerator can avoid performing defrosting during the ice making cycle, thereby reducing the adverse influence of defrosting on the ice maker, effectively increasing the ice making efficiency and ice making capacity of the ice maker, shortening the ice making cycle, reducing energy consumption and improving the reliability of the refrigerator.

For the above objects, in a fourth aspect, the present disclosure provides in embodiments a refrigerator including the control system as described above.

According to embodiments of the present disclosure, using the above described control system, the refrigerator can avoid performing defrosting during the ice making cycle, thereby reducing the adverse influence of defrosting on the ice maker, effectively increasing the ice making efficiency and ice making capacity of the ice maker, shortening the ice making cycle, reducing energy consumption and improving the reliability of the refrigerator.

For the above objects, in a fifth aspect, the present disclosure provides in embodiments an electronic device. The electronic device includes a memory, a processor, and a computer program stored in the memory and executable by the processor. The processor, when executing the program, implements the method for controlling a refrigerator as described above.

According to embodiments of the present disclosure, the electronic device can avoid performing defrosting during the ice making cycle by executing the above control method for a refrigerator, thereby reducing the adverse influence of defrosting on the ice maker, effectively increasing the ice making efficiency and ice making capacity of the ice maker, shortening the ice making cycle, reducing energy consumption and improving the reliability of the refrigerator.

For the above objects, in a sixth aspect, the present disclosure provides in embodiments a non-temporary computer-readable storage medium having stored therein a computer program that, when executed by a processor, implements the method for controlling a refrigerator as described above.

According to embodiments of the present disclosure, the non-temporary computer-readable storage medium can avoid performing defrosting during the ice making cycle by executing the above control method for a refrigerator, thereby reducing the adverse influence of defrosting on the ice maker, effectively increasing the ice making efficiency and ice making capacity of the ice maker, shortening the ice making cycle, reducing energy consumption and improving the reliability of the product.

BRIEF DESCRIPTION OF THE SEVERAL VIEWS OF THE DRAWINGS

FIG. 1 is a flow chart showing a method for controlling a refrigerator according to embodiments of the present disclosure;

FIG. 2 is a schematic diagram showing a temperature and a power of an ice making chamber during a normal defrosting operation;

DETAILED DESCRIPTION

Figure 3:
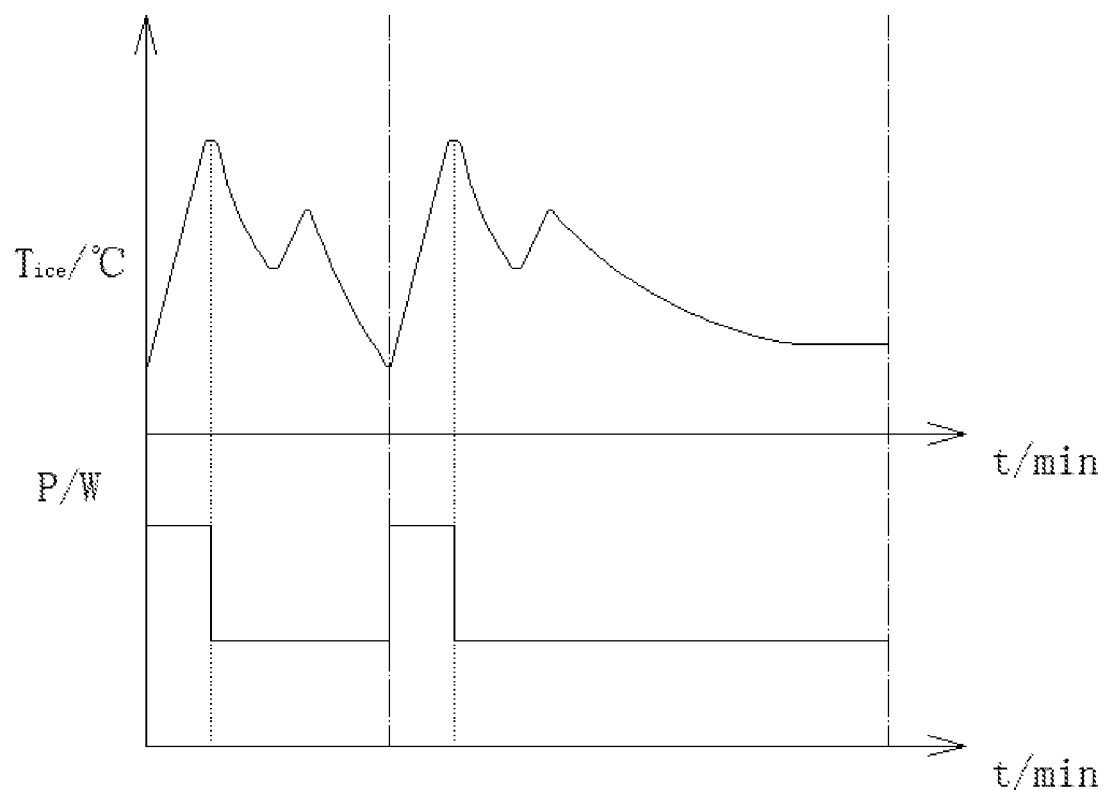
FIG. 3 is a schematic diagram showing a temperature and a power of an ice making chamber during a frost jam caused by delayed defrosting under one circumstance.

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

The method for controlling a refrigerator, the control apparatus of a refrigerator, the control system of a refrigerator and a refrigerator according to embodiments of the present disclosure are described below with reference to the drawings.

FIG. 1 is a flow chart showing a method for controlling a refrigerator according to embodiments of the present disclosure.

In embodiments of the present disclosure, a refrigerator includes at least a compressor and an ice making chamber which is arranged in a refrigerating chamber or a freezing chamber. The refrigerating chamber and the freezing chamber are cooled by a system refrigerating system, and the system refrigerating system at least includes a system evaporator, a system fan, etc. The ice making chamber is cooled independently by an ice making refrigerating system. The ice making refrigerating system includes at least an ice maker, a refrigerating fan, a refrigerating evaporator, etc. The system evaporator is connected to the refrigerating evaporator in series or in parallel.

As shown in FIG. 1, the method for controlling a refrigerator in embodiments of the present disclosure includes the following step S1.

At S1, it is detected and confirmed that a cumulative running time of a compressor is no less than a running time threshold and an ice maker is in a working state at the moment. The ice maker is controlled to perform a defrosting operation after the current ice making cycle is ended. The running time threshold is the time difference between a defrosting cycle of the refrigerator and the ice making cycle of the ice maker.

According to an embodiment of the present disclosure, controlling the ice maker to perform the defrosting operation after the current ice making cycle is ended includes detecting and confirming that the current ice making cycle is ended, and controlling the ice maker to perform the defrosting operation.

Specifically, if the refrigerator performs the defrosting operation merely depending on the cumulative running time of the compressor or other additional conditions, such as starting the defrosting operation when the cumulative running time of the compressor achieves a preset time, without judging the working state which the ice maker is currently in, the starting point of defrosting may be in the second half of the ice making process by the ice maker, and the temperature and power curves of the ice making chamber at that time are shown in FIG. 2. It will cause the temperature of the ice making chamber to rise sharply. The ice maker is not able to continue making ice normally in this cycle, thereby extending the ice making cycle, decreasing the ice making capacity and increasing energy consumption.

Figure 4:
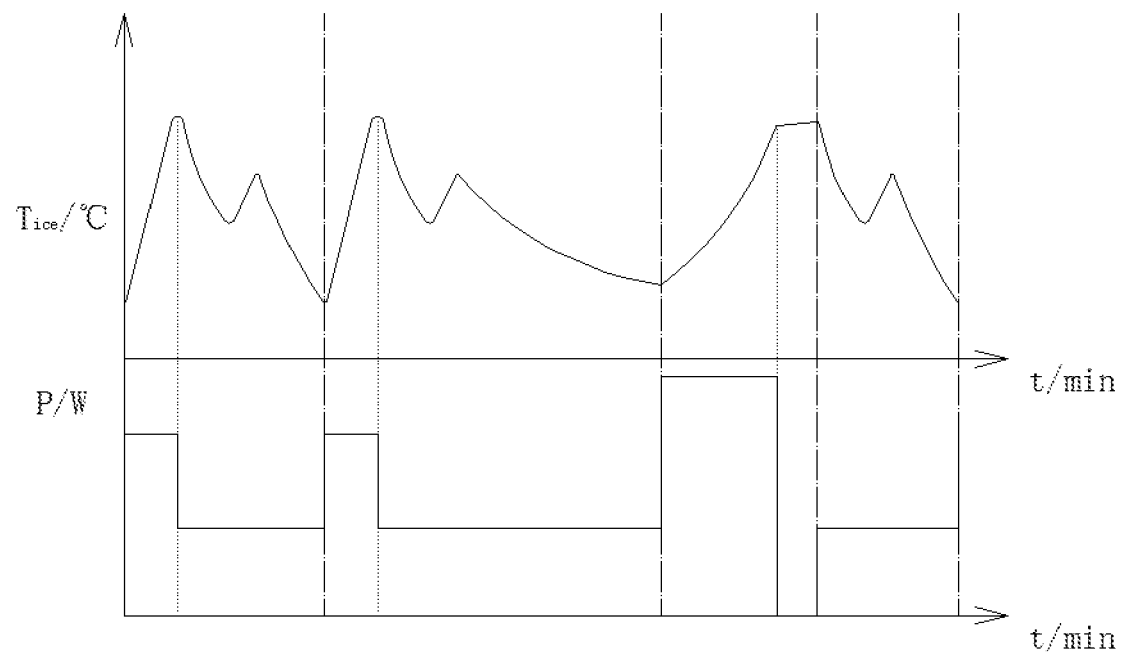
FIG. 4 is a schematic diagram showing a temperature and a power of an ice making chamber during a frost jam caused by delayed defrosting under the other circumstance.

If the working state which the ice maker is in at the moment is determined before defrosting, and when the ice maker is in the working state at the moment, the defrosting operation will be delayed. The delayed defrosting operation will extend the working period of the compressor, and thus increasing the risk of a frost jam occurring at the evaporator. The temperature and power curves of the ice making chamber under the frost jam occurring at the evaporator are shown in FIGS. 3 and 4, for two circumstances. One circumstance is that, after the frost jam occurs at the evaporator, as shown in FIG. 3, the temperature of the ice making chamber drops slowly and finally stops falling, or even rises slightly. Under such a circumstance, the closed loop of the refrigerating system will be destroyed, and the refrigerator cannot work normally. The other circumstance is that, when the frost jam occurs at the evaporator, as shown in FIG. 4, the temperature of the ice making chamber drops slowly and cannot reaches a deicing and heating point, and the ice making will be interrupted and defrosting is performed when the ice making period exceeds the ice making cycle of the ice maker. Under such a circumstance, the energy consumed in this ice making cycle will be wasted totally.

Figure 5:
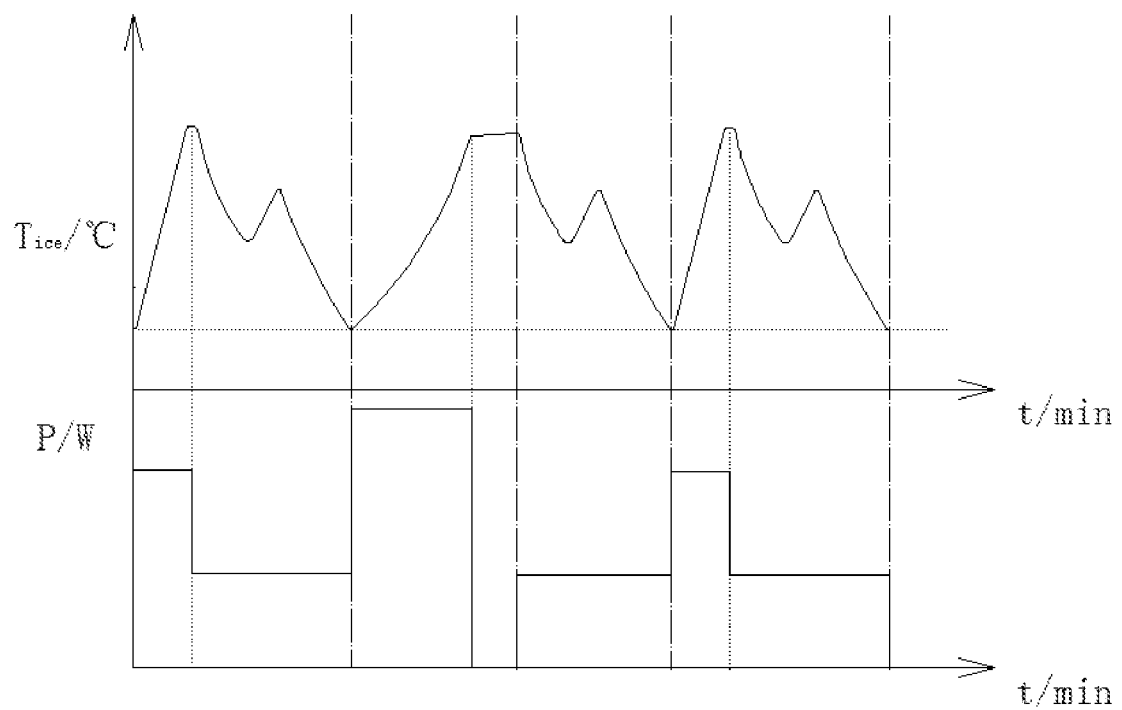
FIG. 5 is a schematic diagram showing a temperature and power of an ice making chamber during advanced defrosting according to an embodiment of the present disclosure.

For this, according to embodiments of the present disclosure, the current working state of the ice maker is determined before defrosting, and when the ice maker is in the working state at the moment, the cumulative running time of the compressor is obtained, and the time difference between the defrosting cycle of the refrigerator and the ice making cycle of the ice maker is obtained as the running time threshold. If the cumulative running time of the compressor is at least (greater than or equal to) the running time threshold, it is determined in real-time whether the running time of the ice maker reaches the ice making cycle. When the running time of the ice maker reaches the ice making cycle, that is, when the current ice making cycle is ended, the ice maker is controlled to perform the defrosting operation in advance, the temperature and power curves of the ice making chamber are shown in FIG. 5. Under this condition, the defrosting of the ice making evaporator has the least impact on the normal ice making of the ice making chamber, and thus can reduce the risk of a frost jam at the ice making evaporator.

Further, the method for controlling a refrigerator as described above further includes detecting and confirming that the cumulative running time is no less than the running time threshold and the ice maker is in a non-working state at the moment, and controlling the ice maker to not issue an ice making request; and detecting and confirming that the cumulative running time reaches the defrosting cycle, and controlling the refrigerator to perform the defrosting operation.

Specifically, the refrigerator takes the cumulative running time of the compressor as a criterion. When the cumulative running time of the compressor is greater than or equal to T-t, where T is the defrosting cycle of the refrigerator, t is the ice making cycle of the ice maker, and T-t is the running time threshold, the current working state of the ice maker is determined. If the ice maker is in the working state at the moment, it is further determined whether the running time of the ice maker reaches the ice making cycle, i.e., it is determined whether the current ice making cycle is ended. If the current ice making cycle is ended, the defrosting operation is performed in advance; if the current ice making cycle is not ended, it will wait for the end of the current ice making cycle to perform the defrosting operation in advance. If the ice maker is in the non-working state at the moment, the ice maker is restrained from issuing the ice making request, and it is determined whether the cumulative running time of the compressor reaches the defrosting cycle T of the refrigerator. If reaches, the refrigerator is controlled to perform the defrosting operation; if not, the ice maker is continued to restrain from issuing the ice making request, and to wait the cumulative running time of the compressor to reaches the defrosting cycle T of the refrigerator to perform the defrosting operation at that time. Thus, the method for controlling a refrigerator can effectively avoid the adverse influence of defrosting on the ice making of the ice maker, thereby effectively increasing the ice making capacity and ice making efficiency of the ice maker, reducing energy consumption, shortening the ice making cycle and improving the reliability of the product.

Figure 6:
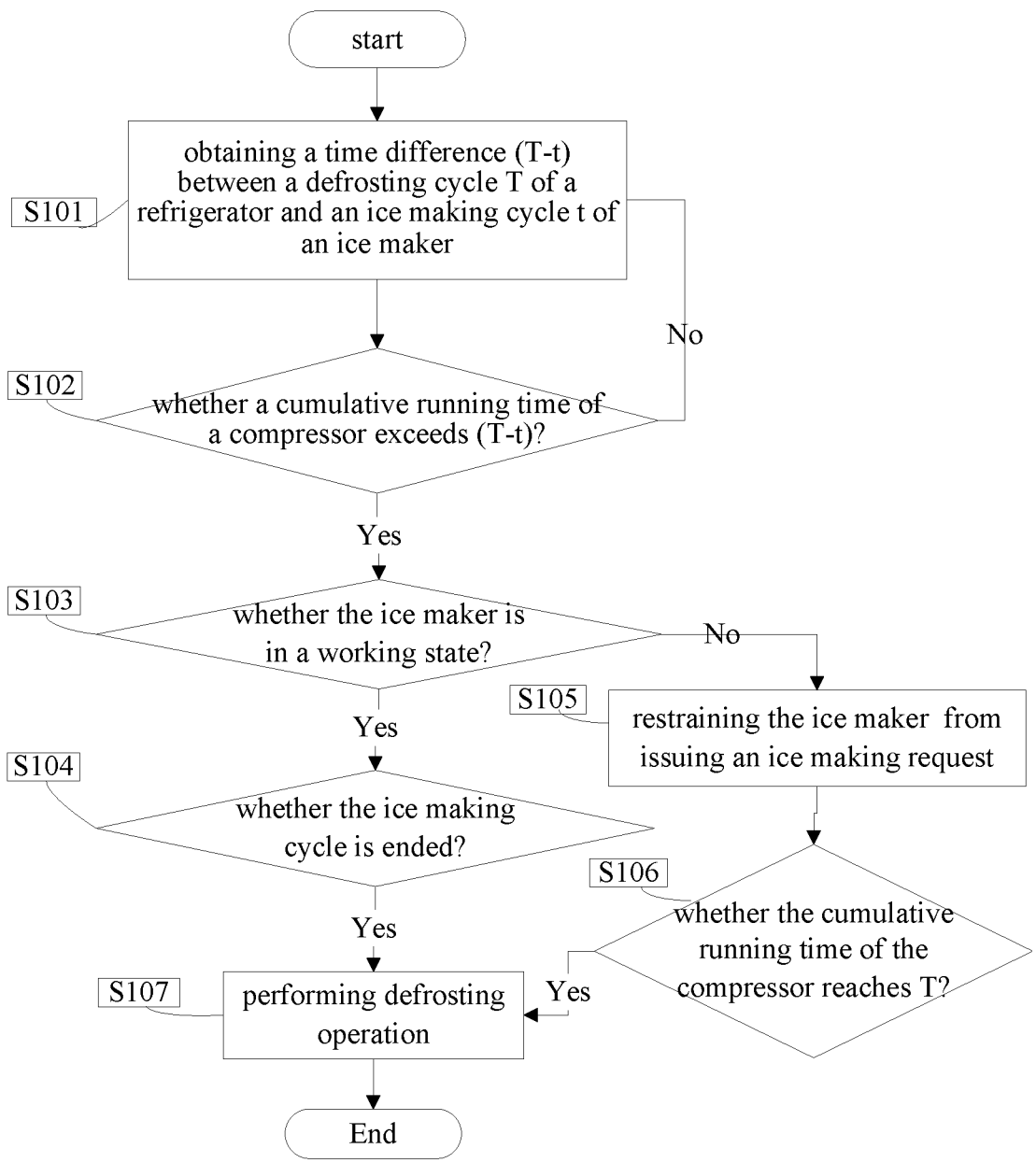
FIG. 6 is a flow chart showing a method for controlling a refrigerator according to a specific embodiment of the present disclosure.

For making one skilled in the art understand the present discourse more clearly, as shown in FIG. 6, the method for controlling a refrigerator according to embodiments of the present disclosure includes the following steps S101 to S107.

At S101, the time difference (T-t) between the defrosting cycle T of the refrigerator and the ice making cycle t of the ice maker is obtained.

At S102, whether the cumulative running time of the compressor exceeds (T-t) is determined. If yes, the step S103 is executed; if no, it is returned to the step S101.

At S103, whether the ice maker is in the working state is determined. If yes, the step S104 is executed; if no, the step S105 is executed.

At S104, whether the ice making cycle is ended is determined. If yes, the step S107 is executed; if no, the step S105 is executed.

At S105, the ice maker is restrained from issuing the ice making request.

At S106, whether the cumulative running time of the compressor reaches T is determined. If yes, the step S107 is executed.

At S107, the defrosting operation is performed.

In summary, according to embodiments of the present disclosure, the method for controlling a refrigerator detects and confirms that the cumulative running time of the compressor is no less than the time difference between the defrosting cycle of the refrigerator and the ice making cycle of the ice maker, and when the ice maker is in the working state at the moment, the method controls the ice maker to perform the defrosting operation after the current ice making cycle is ended. The method can avoid performing defrosting during the ice making cycle, thereby reducing the adverse influence of defrosting on the ice maker, effectively increasing the ice making efficiency and ice making capacity of the ice maker, shortening the ice making cycle, reducing energy consumption and improving the reliability of the product.

Figure 7:
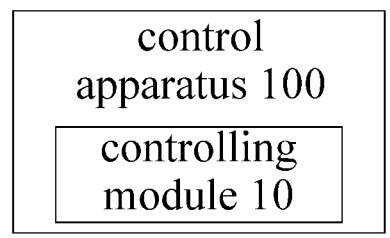
FIG. 7 is a block diagram showing a control apparatus of a refrigerator according to embodiments of the present disclosure.

FIG. 7 is a block diagram showing a control apparatus of a refrigerator according to embodiments of the present disclosure. As shown in FIG. 7, the control apparatus 100 of a refrigerator in embodiments of the present disclosure includes a controlling module 10.

The controlling module 10 is configured to detect and confirm that the cumulative running time of the compressor is no less than a running time threshold and the ice maker is in the working state at the moment, and control the ice maker to perform the defrosting operation after the current ice making cycle is ended. The running time threshold is the time difference between the defrosting cycle of the refrigerator and the ice making cycle of the ice maker.

According to an embodiment of the present disclosure, the controlling module 10 is further configured to detect and confirm that the cumulative running time is no less than the running time threshold and the ice maker is in a non-working state at the moment, and control the ice maker to not issue an ice making request; and detect and confirm that the cumulative running time reaches the defrosting cycle, and control the refrigerator to perform the defrosting operation.

According to an embodiment of the present disclosure, the controlling module 10 is specifically configured to detect and confirm that the cumulative running time is no less than the running time threshold and the ice maker is in the working state at the moment; and detect and confirm the current ice making cycle is ended, and control the ice maker to perform the defrosting operation.

It should be noted that, details that are not disclosed in the control apparatus of embodiments of the present disclosure may refer to the above method of embodiments of the present disclosure, which are not repeated here.

According to the control apparatus of a refrigerator in embodiments of the present disclosure, the controlling module detects and confirms that the cumulative running time of the compressor is no less than the time difference between the defrosting cycle of the refrigerator and the ice making cycle of the ice maker and the ice maker is in the working state at the moment, and controls the ice maker to perform the defrosting operation after the current ice making cycle is ended. The apparatus can avoid performing defrosting during the ice making cycle, thereby reducing the adverse influence of defrosting on the ice maker, effectively increasing the ice making efficiency and ice making capacity of the ice maker, shortening the ice making cycle, reducing energy consumption and improving the reliability of the product.

The present disclosure further provides in the above embodiments a control system of a refrigerator, which includes a compressor, an ice maker and the control apparatus of a refrigerator as described above.

According to embodiments of the present disclosure, the control system of a refrigerator can avoid performing defrosting during the ice making cycle by the above control apparatus of a refrigerator, thereby reducing the adverse influence of defrosting on the ice maker, effectively increasing the ice making efficiency and ice making capacity of the ice maker, shortening the ice making cycle, reducing energy consumption and improving the reliability of the product.

The present disclosure further provides in the above embodiments a refrigerator including the control system of a refrigerator as described above.

According to embodiments of the present disclosure, the refrigerator can avoid performing defrosting during the ice making cycle by the above control system of a refrigerator, thereby reducing the adverse influence of defrosting on the ice maker, effectively increasing the ice making efficiency and ice making capacity of the ice maker, shortening the ice making cycle, reducing the energy consumption and improving the reliability of the product.

In addition, the present disclosure further provides in embodiments an electronic device, including a memory, a processor, and a computer program stored in the memory and executable by the processor. The processor, when executing the program, implements the control method for a refrigerator as described above.

According to embodiments of the present disclosure, the electronic device can avoid performing defrosting during the ice making cycle by executing the above control method for a refrigerator, thereby reducing the adverse influence of defrosting on the ice maker, effectively increasing the ice making efficiency and ice making capacity of the ice maker, shortening the ice making cycle, reducing the energy consumption and improving the reliability of the product.

In addition, the present disclosure further provides in embodiments a non-temporary computer-readable storage medium having stored therein a computer program that, when executed by a processor, implements the control method for a refrigerator as described above.

According to embodiments of the present disclosure, the non-temporary computer-readable storage medium can avoid performing defrosting during the ice making cycle by executing the above control method for a refrigerator, thereby reducing the adverse influence of defrosting on the ice maker, effectively increasing the ice making efficiency and ice making capacity of the ice maker, shortening the ice making cycle, reducing the energy consumption and improving the reliability of the product.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

In addition, in the specification, the terms indicating orientation or position relationship such as "central", "longitudinal", "lateral", "width", "thickness", "above", "below", "front", "rear", "right", "left", "vertical", "horizontal", "top", "bottom", "inner", "outer", "clockwise", "counter-clockwise", "axial", "radial", "circumferential" should be construed to refer to the orientation or position relationship as then described or as shown in the drawings. These terms are merely for convenience and concision of description and do not alone indicate or imply that the device or element referred to must have a particular orientation or must be configured or operated in a particular orientation. Thus, it cannot be understood to limit the present disclosure.

In addition, terms such as "first" and "second" are used herein for purposes of description and are not intended to indicate or imply relative importance or significance or impliedly indicate quantity of the technical feature referred to. Thus, the feature defined with "first" and "second" may comprise one or more this features. In the description of the present disclosure, "a plurality of" means two or more than two this features, unless specified otherwise.

In the present disclosure, unless specified or limited otherwise, the terms "mounted", "connected", "coupled", "fixed" and the like are used broadly, and may be, for example, fixed connections, detachable connections, or integrated connections; may also be mechanical or electrical connections; may also be direct connections or indirect connections via intervening structures; may also be inner communications of two elements or mutual interaction between two elements, unless specified otherwise, which can be understood by those skilled in the art according to specific situations.

In the present disclosure, unless specified or limited otherwise, a structure in which a first feature is "on" or "below" a second feature may be an embodiment in which the first feature is in direct contact with the second feature, or an embodiment in which the first feature and the second feature are contacted indirectly via an intermediation. Furthermore, a first feature "on", "above" or "on top of" a second feature may include an embodiment in which the first feature is right or obliquely "on", "above" or "on top of" the second feature, or just means that the first feature is at a height higher than that of the second feature; while a first feature "below", "under" or "on bottom of" a second feature may include an embodiment in which the first feature is right or obliquely "below", "under" or "on bottom of" the second feature, or just means that the first feature is at a height lower than that of the second feature.

Reference throughout this specification to "an embodiment", "some embodiments", "an example", "a specific example" or "some examples" means that a particular feature, structure, material, or characteristic described in connection with the embodiment or example is included in at least one embodiment or example of the present disclosure. Thus, the appearances of the phrases such as "in some embodiments", "in one embodiment", "in an embodiment", "in another example", "in an example", "in a specific example" or "in some examples", in various places throughout this specification are not necessarily referring to the same embodiment or example of the present disclosure. Furthermore, the particular features, structures, materials, or characteristics may be combined in any suitable manner in one or more embodiments or examples. In addition, those skilled in the art can combine different embodiments or examples and features in different embodiments or examples without contradicting each other.

Although explanatory embodiments have been shown and described, it would be appreciated by those skilled in the art that the above embodiments cannot be construed to limit the present disclosure, and changes, alternatives, and modifications can be made in the embodiments in the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method for controlling a refrigerator, comprising:
    determining that a cumulative running time of a compressor is no less than a running time threshold;
    determining that an ice maker is currently in a working state; and
    controlling the refrigerator to perform a defrosting operation after a current ice making cycle is ended,
    wherein the running time threshold is a time duration difference between a first time duration of a defrosting cycle of the refrigerator and a second time duration of an ice making cycle of the ice maker.

2. The method according to claim 1, further comprising:
    determining that the cumulative running time is no less than the running time threshold and the ice maker is currently in a non-working state;
    controlling the ice maker to not issue an ice making request;
    determining that the cumulative running time reaches a defrosting threshold for starting the defrosting cycle; and
    controlling the refrigerator to perform the defrosting operation.

3. The method according to claim 1, wherein controlling the ice maker to perform the defrosting operation after the current ice making cycle is ended comprises:
    determining that the current ice making cycle is ended; and
    controlling the refrigerator to perform the defrosting operation.

4. A control apparatus of a refrigerator, comprising:
    a controlling module, configured to determine that a cumulative running time of a compressor is no less than a running time threshold and an ice maker is currently in a working state, and control the refrigerator to perform a defrosting operation after a current ice making cycle is ended,
    wherein the running time threshold is a time duration difference between a first time duration of a defrosting cycle of the refrigerator and a second time duration of an ice making cycle of the ice maker.

5. The control apparatus according to claim 4, wherein the controlling module is further configured to:
    determine that the cumulative running time is no less than the running time threshold and the ice maker is in a non-working state currently,
    control the ice maker to not issue an ice making request; and
    determine that the cumulative running time reaches a defrosting threshold for starting the defrosting cycle; and
    control the refrigerator to perform the defrosting operation.

6. The control apparatus according to claim 4, wherein the controlling module is further configured to:

determine that the cumulative running time is no less than the running time threshold and the ice maker is currently in the working state; determining that the current ice making cycle is ended; and control the refrigerator to perform the defrosting operation.

7. A control system of a refrigerator, comprising:

a compressor, an ice maker; and the control apparatus of a refrigerator according to claim 4.

8. A refrigerator, comprising the control system of a refrigerator according to claim 7.

9. An electronic device, comprising:

a memory, a processor, and a computer program stored in the memory and executable by the processor, wherein the processor, when executing the program, implements a method for controlling a refrigerator according to claim 1.

10. A non-temporary computer-readable storage medium having stored therein a computer program that, when executed by a processor, implements a control method for a refrigerator according to claim 1.

* * * * *